United States Patent [19]
Arora

[11]  4,376,686
[45]  Mar. 15, 1983

[54] AC ETCHING OF ALUMINUM CAPACITOR FOIL

[75] Inventor: Mulk R. Arora, Williamstown, Mass.

[73] Assignee: Sprague Electric Company, North Adams, Mass.

[21] Appl. No.: 321,973

[22] Filed: Nov. 16, 1981

[51] Int. Cl.³ ............................................... C25F 3/04
[52] U.S. Cl. ............................. 204/129.85; 204/129.95
[58] Field of Search ........................ 204/129.85, 129.95

[56] References Cited

U.S. PATENT DOCUMENTS

| 4,276,129 | 6/1981 | Kanzaki et al. | 204/58 |
| 4,319,972 | 3/1982 | Bernis | 204/129.95 |
| 4,332,652 | 6/1982 | Arora | 204/129.75 |

Primary Examiner—T. Tufariello

[57] ABSTRACT

Aluminum capacitor foil is etched using AC current and an etchant bath comprising 0.8 to 1.5 M hydrochloric acid, 0.4 to 0.5 M aluminum chloride, 0.04 to 0.3 M nitric acid, and 0.05 to 0.2 M tartaric acid. The frequency of the alternating current is 12 to 20 Hz, and the bath temperature is 30° to 40° C.

4 Claims, 1 Drawing Figure

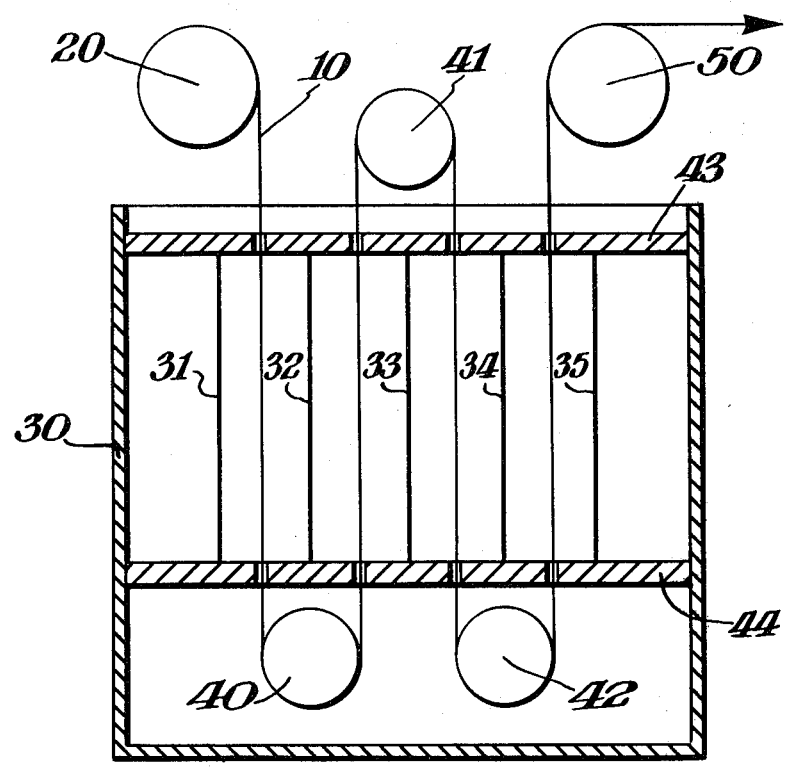

AC ETCHING OF ALUMINUM CAPACITOR FOIL

BACKGROUND OF THE INVENTION

This invention relates to AC etching of aluminum foil for electrolytic capacitors, and in particular to a process utilizing alternating current and a chloride electrolyte bath containing tartaric and nitric acids.

AC etching has been used to produce aluminum articles such as lithographic plates and capacitor foil. It also has been used to electropolish aluminum articles prior to metal plating.

The prior art has discussed the difficulties in obtaining an even or uniform etch structure and has overcome these difficulties in a variety of ways, e.g., interrupting the etch process to apply protective coatings, carrying out the etch process in stages of differing degrees of aggressiveness, and using additives in the electrolyte bath to control pit size or to increase mechanical strength of the foil.

Another problem associated with prior art etching of aluminum foil has been to prevent aluminum hydroxide, formed during etching, from precipitating on or into the etched surfaces.

The resolution of these problems had led to prior art processes in which the etch conditions are carefully controlled to provide the desired increase in surface area and, particularly for capacitor foil, with little change in mechanical strength. Such a process is described by Arora and Randall in U.S. Pat. No. 4,279,714 issued July 21, 1981 that utilizes a phosphate in the hydrochloric etch bath. Another such process is described by Arora, Paquette, and McPherson in compending U.S. patent application Ser. No. 280,659 filed July 6, 1981 that utilizes phosphoric and nitric acids in the hydrochloric acid etch bath. These materials however must be removed from the etch structure before the foil is processed to make electrolytic capacitors.

SUMMARY OF THE INVENTION

The present invention overcomes the difficulty of removing etchant materials form the etch structure before processing the electrolytic capacitor foil further.

A feature of this invention is the provision of a process of etching aluminum capacitor foil which utilizes AC current to give a uniform etch structure while maintaining the strength of the foil. Another feature is the provision of an electrolyte that is readily removed from the foil surface and etch structure.

The above objectives are accomplished in accordance with this invention by using an etchant solution containing hydrochloric acid, aluminum chloride, nitric acid, and tartaric acid at 30° to 40° C., and alternating current of 12 to 20 Hz frequency.

The concentration of the hydrochloric acid in the etchant is 0.8 to 1.5 M to provide strongly acidic conditions that prevent the formation and precipitation of aluminum hydroxide on the foil. The concentration of the aluminum chloride is 0.4 to 0.5 M to initially catalyze the reaction, especially with fresh etchant solution. The concentration of nitric acid is 0.04 to 0.3 M to give the desired uniformity and etch density (number of pits/unit area of foil). The concentration of the tartaric acid is 0.05 to 0.2 M and seems to passivate sites that have already been started, so that etching will proceed at different sites, giving the desired etch density, rather than concentrating at started sites. The tartaric acid also is easier to remove from the etch structure, thus making subsequent processing easier.

The frequency of the alternating current is maintained at 12 to 20 Hz, preferably 13 to 15 Hz. The frequency is critical with the electrolyte of this invention, inasmuch as capacitance rapidly falls off outside this range. The voltage, a function of current density and etch cell design, is ±7 V. With a different cell design, the voltage will differ also.

The temperature of the etchant solution is maintained at about 30° to 40° C. to provide pores of suitable size and density. Lower temperatures result in fewer and larger pores, while higher temperatures give more pores but narrower pits and lower capacitance at higher formation voltages.

BRIEF DESCRIPTION OF THE DRAWING

The sole FIGURE shows foil being etched in accordance with the process of the present invention.

DESCRIPTION OF THE PREFERRED EMBODIMENTS

Aluminum foil 10 is passed over roll 20 into etching tank 30 between insulated electrodes 31 and 32, under roll 40 and between electrodes 32 and 33, over roll 41 and between electrodes 33 and 34, under roll 42 and between electrodes 34 and 36, and out of tank 30 and over roll 50. The electrodes are carried by insulated frames 43 and 44 that have openings for passage of foil 10. More electrodes and rolls may be used than shown. In fact, it is more efficient to use more electrodes, but enough have been shown to illustrate the invention.

Because the electrodes 31, 32, 33, 34 and 35 are mounted in insulated frames 43 and 44, the alternating current passed through them is forced to pass through the foil and not through the main body of etchant solution. In this way, the foil is electrochemically etched during the time the foil passes between a pair of electrodes, and not electrochemically etched when outside the frame, e.g., between frame 44 and roll 40.

The etched foil obtained by the method of the present invention retains a solid metallic core that gives good mechanical properties and low-temperature capacitance retention. There is an interrelationship among etchant composition and concentration, temperature, and AC frequency, with the last being the most crucial, that gives the desired results, i.e. good capacitance and mechanical properties, not just etchant composition and concentration alone.

In the examples below, soft foil of 99.99% purity was used. Hard foil can be etched by this process, as can foil of different purity, but satisfactory capacitance is obtained without resorting to hard foil and the processing problems associated therewith.

The etch scheme used in that described by Arora in copending U.S. patent application Ser. No. 188,637 filed Sept. 19, 1981, which is incorporated by reference herein.

EXAMPLE 1

Soft aluminum foil of 2.9 mil (0.1 mm) initial thickness was etched intermittently using alternating current and as etchant electrolyte a mixture of hydrochloric acid, aluminum chloride, nitric acid, and tartaric acid.

In Table 1a, electrolyte composition and molar concentration, M (moles/liter), is given for each run.

TABLE 1a

| Run | HCl | AlCl₃ | HNO₃ | Tartaric Acid |
|---|---|---|---|---|
| 1 | 1.4 | 0.4 | 0.16 | 0.11 |
| 2 | 1.4 | 0.4 | 0.16 | 0.11 |
| 3 | 1.4 | 0.4 | 0.04 | 0.11 |
| 4 | 1.4 | 0.4 | 0.12 | 0.11 |
| 5 | 1.4 | 0.4 | 0.16 | 0.11 |
| 6 | 1.4 | 0.4 | 0.20 | 0.11 |
| 7 | 1.4 | 0.4 | 0.24 | 0.11 |
| 8 | 0.9 | 0.4 | 0.29 | 0.05 |
| 9 | 0.9 | 0.4 | 0.29 | 0.05 |
| 10 | 0.9 | 0.4 | 0.14 | 0.2 |
| 11 | 1.5 | 0.4 | 0.05 | 0.1 |
| 12 | 1.2 | 0.4 | 0.1 | 0.15 |
| 13 | 0.8 | 0.46 | 0.12 | 0.05 |
| 14 | 1.25 | 0.42 | 0.15 | 0.075 |

In Table 1b, etching conditions and results are presented for the runs of Table 1a. The temperature is degrees Celsius (°C.), alternating current frequency is in Hertz (Hz), thickness is foil thickness in mils after etching, and 10 V and 30 V capacitance is capacitance/unit area ($\mu F/in^2$).

TABLE 1b

| Run | Temp | Freq. | Thickness | Wt. loss % | Capacitance 10V | Capacitance 30V |
|---|---|---|---|---|---|---|
| 1 | 35 | 17 | 2.88 | 31.9 | 331 | 99.9 |
| 2 | 35 | 20 | 2.88 | 32.5 | 279 | 84.0 |
| 3 | 37 | 14 | 2.86 | 34.3 | 276 | 93.1 |
| 4 | 37 | 14 | 2.87 | 33.9 | 330 | 106.3 |
| 5 | 37 | 14 | 2.88 | 32.8 | 361 | 108.8 |
| 6 | 37 | 14 | 2.88 | 33.5 | 377 | 113.1 |
| 7 | 37 | 14 | 2.85 | 41.5 | 425 | 127.3 |
| 8 | 33 | 14 | 2.85 | 35.2 | 194 | 55.8 |
| 9 | 42 | 14 | 2.85 | 35.6 | 364 | 100.0 |
| 10 | 42 | 14 | 2.90 | 34.3 | 61.5 | 19.3 |
| 11 | 36 | 14 | 2.84 | 33.2 | 286 | 98.2 |
| 12 | 42 | 14 | 2.82 | 34.9 | 303.0 | 79.2 |
| 13 | 35 | 12 | * | 39.0 | 257 | 79.3 |
| 14 | 33 | 13.8 | * | 35.9 | 358 | 107 |

*Thickness not measured

An added advantage of the electrolyte of this invention is that the concentration of the constituents can vary somewhat without adversely affecting results. The preferred concentration of the hydrochloric acid is 0.8 to 1.5 M, as below 0.5 M not enough etching took place and above 1.8 M macrothinning of the foil took place.

The functions of the nitric and tartaric acids are to give the desired uniformity of the etch structure. It is believed that the tartaric acid is more important on the foil surface and that the nitric acid is more important in the tunnels or pits.

The presence of nitric acid is critical. Without it, capacitance is about one-third lower and weight loss is 4 to 5% higher leading to poorer mechanical properties of the etched foil.

The tartaric acid concentration is 0.05 to 0.2 M; the 0.05 M is the lower practical limit although less will work. Above 0.2 M tartaric acid, capacitance begins to decrease.

As is known, aluminum chloride initially catalyzes the etching reaction, and for that reason at least 0.2 moles/liter must be present initially. Higher concentrations of aluminum ion are preferred, as electrolyte recycle and recovery rate are a function of aluminum ion concentration. However, above about 0.5 M aluminum ion concentration, the character of the etching changes to a uniform corrosion rather than preferential tunnel etching. Therefore, 0.5 M aluminum ion concentration is the upper limit with about 0.4 M preferred.

Frequency also controls the number and size of the etch sites; with high frequency, many small sites are formed while at lower frequencies, there are fewer but larger sites. High frequency also means many short anodiccathodic cycles per second. With a highly passivating electrolyte, many short cathodic cycles are needed. With a weaker passivating electrolyte, fewer but longer cathodic cycles/second are desired. Optimum frequency was found to be 13 to 15 Hz in the laboratory with 12 and 20 Hz as the lower and upper limits.

As a practical matter for commercial production, the concentrations of the hydrochloric, nitric, and tartaric acids are kept as low as possible while the concentration of aluminum chloride is kept as high as possible to keep the recycle rate within reasonable limits. Thus, for the above process, the hydrochloric acid concentration is 0.8 to 1.5 M, the nitric acid concentration is 0.04 to 0.3 M, the tartaric acid concentration is 0.05 to 0.2 M, and the aluminum chloride concentration is 0.4 to 0.5 M. At these concentrations, the frequency is 12 to 20 Hz, preferably 13 to 15 Hz, and the temperature is 30° to 40° C.

What is claimed is:

1. A process for the etching of aluminum capacitor foil comprising passing the foil through an electrolytic bath under the influence of alternating current, said bath consisting essentially of 0.8 to 1.5 moles/liter of hydrochloric acid, 0.4 to 0.5 moles/liter aluminum chloride, 0.04 to 0.3 moles/liter of nitric acid, and 0.05 to 0.2 moles/liter of tartaric acid, said alternating current having a frequency of 12 to 20 Hz, at a temperature of about 30° to 40° C. rendering said foil more amenable to subsequent processing.

2. A process according to claim 1 wherein said frequency is 13 to 15 Hz.

3. A process according to claim 1 wherein said temperature is 33° to 36° C.

4. A process according to claim 1 wherein the concentration of said hydrochloric acid is 1 to 1.4 moles/liter, the concentration of said nitric acid is 0.1 to 0.3 moles/liter, and the concentration of said tartaric acid is 0.05 to 0.15 moles/liter.

* * * * *